United States Patent [19]
Stowe et al.

[11] Patent Number: 5,166,994
[45] Date of Patent: Nov. 24, 1992

[54] LOW COST ONE BY EIGHT SINGLEMODE OPTICAL FIBER COUPLER

[75] Inventors: David W. Stowe; Daniel R. Campbell, both of Medfield, Mass.

[73] Assignee: Aster Corporation, Milford, Mass.

[21] Appl. No.: 664,810

[22] Filed: Mar. 5, 1991

[51] Int. Cl.$^5$ .............................................. G02B 6/34
[52] U.S. Cl. ........................................ 385/48; 385/24; 385/46
[58] Field of Search ............... 350/96.15, 96.16, 96.24; 385/24, 46, 48, 51, 115

[56] References Cited

U.S. PATENT DOCUMENTS

| | | | |
|---|---|---|---|
| 4,360,248 | 11/1982 | Bickel et al. | 350/96.16 |
| 4,400,055 | 8/1983 | Ozeki et al. | 350/96.15 |
| 4,556,279 | 12/1985 | Shaw et al. | 350/96.15 |
| 4,708,424 | 11/1987 | Marhic | 350/96.19 |
| 4,772,085 | 9/1988 | Moore et al. | 350/96.15 |
| 4,836,644 | 6/1989 | Eisenmann et al. | 350/96.16 |
| 4,907,851 | 3/1990 | Marhic | 350/96.19 |
| 4,986,620 | 1/1991 | Severijns et al. | 350/96.15 |

Primary Examiner—Frank Gonzalez
Attorney, Agent, or Firm—Fish & Richardson

[57] ABSTRACT

A means of fabricating wideband 1×8 singlemode fiber optic couplers is disclosed. It has been found that a 1×7 fiber optic coupler can be fused by twisting six fibers around a central seventh fiber, heating the region on contact among the seven fibers, and drawing until the desired distribution of optical power is achieved among the seven fibers. Both 1×6 and 1×7 couplers can be made this way depending upon the extent of drawing. Using such a coupler in combination with conventional 1×2 and wideband 1×2 couplers allows fabrication of 1×8 couplers using only two or three separate couplers compared to seven couplers required in coupler tree structures. Further, by taking advantage of selected wavelength response behaviors characteristic of each coupler in the combination, the combination of 1×2 and 1×7 or 1×6 couplers is done in a manner to provide relatively improved coupling uniformity over a bandwidth of ± 50 nm around the operating wavelengths of the 1×8 coupler.

18 Claims, 5 Drawing Sheets

LOW COST ONE BY EIGHT SINGLEMODE OPTICAL FIBER COUPLER

FIELD OF THE INVENTION

The invention relates to wideband singlemode optical fiber couplers capable of splitting light input in one optical fiber into seven, or eight output fibers.

BACKGROUND

It is often necessary to branch an optical fiber into more than two output fibers. Typical applications requiring such branching are found in fiber optic communication distribution systems. It is customary, if not necessary, to branch fibers in binary steps, e.g., 1 fiber branches into 2, 4, 8, or 16 fibers. In such a coupler, or splitter, the percentage of input light distributed to each of the output branches should be constant over a range of environmental extremes. This percentage should be stable over relatively wide thermal regimes, e.g., −40 to 80 degrees centigrade, should be independent of the input optical polarization state, and should be substantially constant over a range of optical wavelengths envisioned for the optical system. The intrinsic, or built-in, uniformity of the percentage of input light delivered to each output depends upon the repeatability of the manufacturing process.

Optical fiber couplers can be made by fusing two or more optical fibers during a tensioned elongation according to a process that has become familiar to those skilled in the art known as fused tapering. Key to the success of this operation is control of the placement of fibers prior to fusion. Fibers must be made to contact each other in the region to be heated and fused. Imperfections in or dirt on the surfaces of fibers, minor imbalances in tension forces applied to the fibers prior to application of fusion heat, and three dimensional non-uniformity of the heat applied are among factors which account for a low success rate of fused tapered couplers in manufacturing setups.

One prior approach to establishing and maintaining reliable contact among fibers prior to and during fusion employs a surrounding tube of optical material. Fibers in the set to be fused are placed inside a tube of lower refractive index than the cladding material of the fibers. The entire assembly is then heated and drawn in the usual manor. This approach can yield very good results in terms of uniformity and excess loss.

Couplers made using a surrounding optical media can be made to have a degree of wavelength tolerance over the 1200 nm to 1600 nm optical wavelength band. According to the methods of prior art, such 1×7 couplers are drawn until substantially equal power is output from all seven fibers at two predetermined wavelengths, e.g., 1300 and 1500 nm. When this is done the six surrounding fibers demonstrate a variation of optical coupling of the order of 3.0 percent over wavelength range of 1200 to 1600 nm. The central fiber, however, demonstrates more than 12% variation of power coupling over that same range of wavelengths. The tubed 1×7 coupler is therefore most suitable as a 1×6 coupler when wavelength stability is required.

The surrounding tube approach also has the disadvantage that the surrounding tube must be made to fit rather snugly around the fibers. Fibers used for coupler fabrication typically have an outer polymer layer known as the jacket. A tube sized to fit snugly around, e.g., seven fibers should have an inside diameter slightly greater than 3 times the diameter of the unjacketed fiber. Geometrical considerations dictate that such a tube cannot be fitted around seven fibers unless the jacketing material is removed from all of the fibers before the fibers are located in the tube. Since the fused coupler is formed in a short central region of longer fibers after the jacket is removed from all fibers in that region, it is inherent that the tension control mechanisms of most coupler manufacturing stations require that continuous fibers must be used. Tension is applied by holding the fibers on both sides of the central region in clamps attached to translation stages, often called drawing stages. Feeding long fibers into the tube is time consuming and has a high risk of contaminant transfer. This requires clean room environments for reliable coupler manufacturing.

Moreover, while prior art shows it possible to obtain reasonably good quality couplers by employing a surrounding optical medium to position the fibers prior to and during fusion, the approach does not lead to the desired 1×8 configuration and is difficult, if not impossible, to adapt to economical manufacturing.

Other approaches to fabricating 1×8 couplers generally entail tree structures wherein 1×2 couplers are spliced together. Typically a first 1×2 coupler splits the light input on one fiber into two outputs. These two outputs pass to the input of two more 1×2 couplers giving 4 outputs. These 4 outputs are then split again using four more 1×2 couplers yielding a total of eight outputs. Such a tree requires seven 1×2 couplers acquire a 1×8 split. The performance parameters of each of the seven component coupler becomes critical to the final performance of the tree assembly. Splicing losses must be carefully managed. The overall assembly is bulky and fragile because of the vulnerability of the interconnecting fibers between couplers in the tree. Moreover, a seven coupler assembly comprising a 1×8 tree has seven fused coupling regions and as many as 6 splice points. The failure of any one of these requires replacement of the entire tree assembly.

Considering the present state of the art in coupler fabrication technology, there is no economical means to make a robust, broadband 1×7 or 1×8 coupler. The invention addresses that need.

SUMMARY OF THE INVENTION

The invention is a means by which a unitary 1×7 coupler is advantageously combined with other couplers in manners to improve the overall wavelength response of the resulting 1×8 coupler.

According to the invention, a unitary 1×7 coupler is defined as a singlemode fiber optic coupler wherein seven fibers are fused and elongated so that six fibers surround a central seventh fiber in a first coupling region. In the 1×7 coupling region, optical power input on the central fiber is distributed among the six surrounding fibers. For this current discussion we assume that the input light is substantially monochromatic. Therefore the percentages used to exemplify the embodiment relate to light within a few nanometers of the some arbitrary wavelength.

According to the first embodiment of the invention, following the coupling region of the unitary 1×7 coupler, the central fiber carries between 19% and 31% of the input optical power. The central fiber extends beyond the unitary 1×7 coupling region and is fused to an eighth optical fiber to form a 1×2 coupling region. In this 1×2 coupling region the optical power remaining in the central fiber output from the 1×7 coupling region is divided substantially equally between the central fiber and the eighth fiber. Neglecting excess losses, the output fibers of the second coupler therefore carry between 9.5% and 15.5% of the original input optical power. The surrounding fibers extend in both directions beyond the 1×7 coupling region while the eighth fiber and the central fiber extend in one direction beyond the 1×2 coupling region sufficiently to allow access to at least one input fiber and eight output fibers. The combination of the 1×7 and 1×2 coupling regions and the extending fibers constitute a 1×8 coupler with uniformity of at worst 2.9 dB.

Advantageously, according to the invention, the wavelength response of the combination of couplers can be made flatter than the wavelength response of the 1×7 coupler alone. This is discussed in greater detail in the Detailed Description of the Preferred Embodiments.

In a second embodiment, the order of the two couplers is reversed so that the first coupler is a 1×2 made to deliver about 84% to 91% of the input light to the "coupled" fiber. The 1×2 coupler is usually a wideband coupler. After the 1×2 coupling region, the "through" fiber of the 1×2 coupler thus carries about 9% to 16% of the original input optical power. A unitary 1×7 coupler is then formed on the "coupled" fiber as the second coupler. The "coupled" fiber is made to be the central fiber of the 1×7 coupler. The 1×7 is drawn until the seven optical outputs each carry between 9% and 16% of the optical power originally present in the central fiber, or equivalently, until all seven outputs are nominally equal. The "through" fiber of the leading 1×2 coupler is used as the eighth output fiber.

A third embodiment is a 1×8 coupler comprising the combination of three couplers. The first coupler is a wideband 1×2 coupler providing a nominal 25% by 75% split of the input optical power into the two outputs. A 25/75 split is used herein for purposes of discussion. The actual splitting ratio required depends on the combined characteristics of the leading 1×2 and the two couplers which follow. In this discussion the effects of excess loss are ignored.

The 25% leg of the first 1×2 coupler is routed to a 50% by 50% 1×2 coupler. Each output from this second coupler therefore carries about 12.5% of the light input to the first coupler. The second leg of the first coupler is routed to the central fiber of a third coupler comprising a 1×6 coupler made by drawing a group of seven fibers until substantially all of the power input in the central fiber is distributed uniformly to the six surrounding fibers. Each of the six outputs from this coupler therefore carry substantially one sixth of 75%, or 12.5%, of the light input to the first coupler.

Of novel importance in any of these embodiments is the ability to optimize the wavelength dependence of the resulting 1×8 coupler.

A fourth embodiment of the invention is a singlemode fiber optic coupler wherein seven fibers are fused and elongated so that six fibers surround a central seventh fiber in a coupling region. Optical power input on the central fiber is distributed among the six surrounding fibers so that the distributed light makes up substantially 6% to 100% of the input light. This 5% to 100% of the input light is distributed among the surrounding fibers so that any surrounding fiber may carry between 1% and 16.7% of the input optical power. Following the coupling region, the central fiber, therefore, carries 94% and 0% of the input optical power. The surrounding and central fibers extend to both sides of the coupling region sufficiently to provide access to at least one input and seven outputs. This singlemode fiberoptic coupler substantially constitutes a 1×6 or a 1×7 fiberoptic splitter with uniformity among the six surrounding fibers of, at worst, 2.5 dB in the wavelength band of interest.

Typically, the combined fiber optic couplers of the first three embodiments are packaged as separate units. These separate coupling regions can however be housed in a single package having between one and eight input fibers and between one and eight output fibers. The fibers interconnecting the couplers may be continuous, or the couplers may be spliced together.

Common to all embodiments, the preferred method of maintaining fiber contact in the 1×7 section prior to fusion involves wrapping the surrounding fibers helically around the central fiber. The helix angle is initially large enough to ensure that each surrounding fiber wraps at least halfway around the central fiber in the length of the region to be fused. The intimate contact of the surrounding fibers with the central fiber ensures proper fusion and taper formation when heat is applied and drawing commences.

The central fiber is supplied optical power during the drawing process. The output of the central fiber and outputs of one or more of the surrounding fibers are monitored during the fusing draw. Drawing is stopped when the power coupled into the surrounding fibers reaches the desired fraction of the optical power carried in the central fiber.

Following packaging of the 1×7 coupler thus formed, a 1×2 coupler is formed on the output leg of the central fiber. A new eighth fiber is fused to the central fiber output using similar drawing methods, except the drawing is stopped when the optical powers carried by the two output fibers of the second coupler are essentially equal. For couplers of the third embodiment these steps may be reversed and drawing is halted when appropriately different coupling ratios are obtained.

The features of the embodiments of the invention will be further clarified in the Detailed Description which follows. First we briefly discuss the figures.

DESCRIPTION OF THE FIGURES

FIG. 2 is a three-part figure presenting graphical data representing the output coupling versus wavelength characteristics for FIG: 2a, a conventional 1×2 50/50 coupler; 2b, a 1×7 coupler; and 2c, the results of combining the 1×7 and 1×2 as in FIG. 1a.

DETAILED DESCRIPTION OF PREFERRED EMBODIMENTS

Figure 1A:
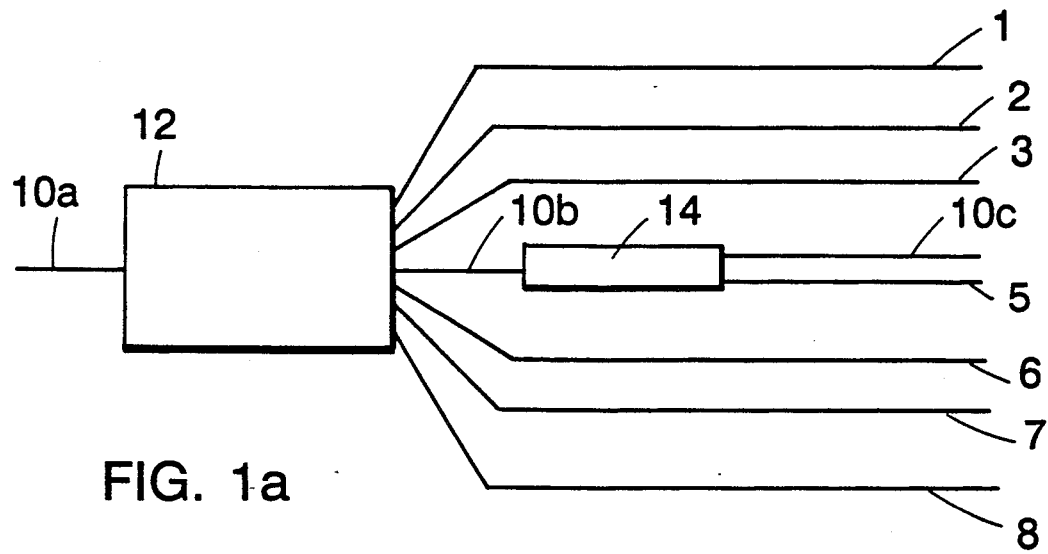
FIG. 1 is a two-part figure wherein FIG. 1a schematically illustrates a 1×8 coupler of the first embodiment and FIG. 1b illustrates the cross-sectional view of seven fibers arranged as they might be prior to fusion of a unitary 1×6 or 1×7 coupling region.
Figure 1B:
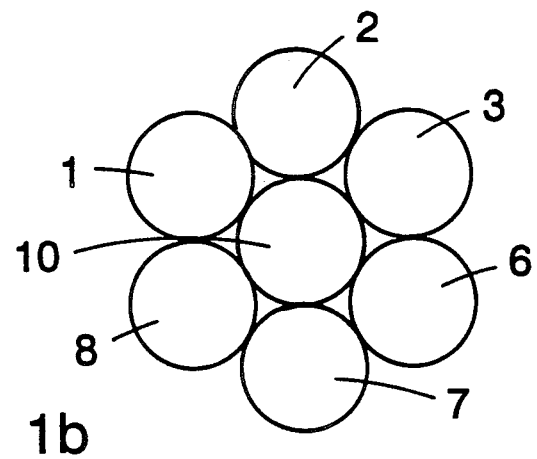

FIG. 1 schematically illustrates a 1×8 coupler of the first embodiment. Featured in FIG. 1a, the fused and packaged part of the first 1×7 coupler is generally denoted by the numeral 12. The input fiber 10 is the central fiber of a group of seven fibers illustrated in FIG. 1b. Central fiber 10 is denoted 10a, 10b and 10c at different points in FIG. 1a and 1b because of significant differences in the characteristics of the optical power carried by fiber 10 at those locations in the invention.

FIG. 1b schematically illustrates the cross-section of the 1×7 coupler 12 at any arbitrary point in the 1×7 coupling region prior to fusion. In the region shown in FIG. 1b, six fibers 1, 2, 3, 6, 7, and 8 are disposed around the central fiber 10. Since all fibers in the group of seven have substantially identical diameters, each surrounding fiber touches both the central fiber and each of its neighboring fibers.

As shown in FIG. 1a, after the 1×7 coupler 12, the central fiber 10b emerges and is subsequently fused to another fiber 5 in a second packaged coupling region 14. Fiber 10b is coupled to fiber 5 so that 50% of the optical power carried in fiber 10b is distributed to the outputs 10c and 5 of the 1×2 coupler 14.

Figure 2A:
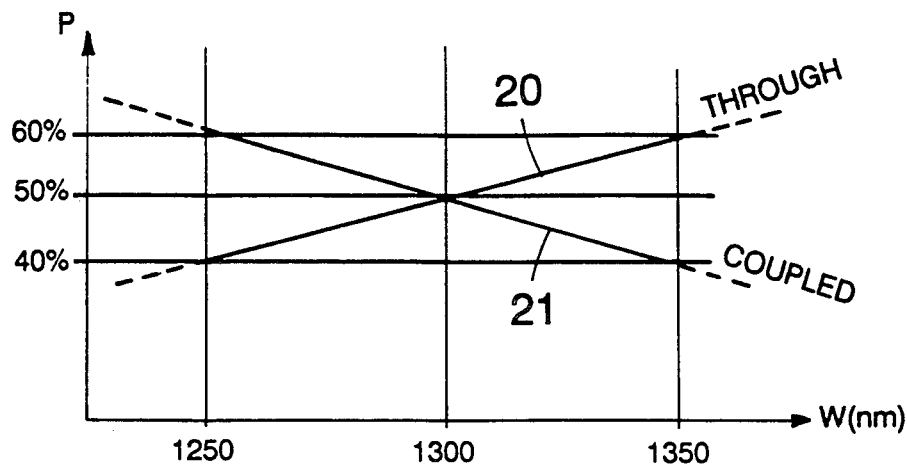
Figure 2B:
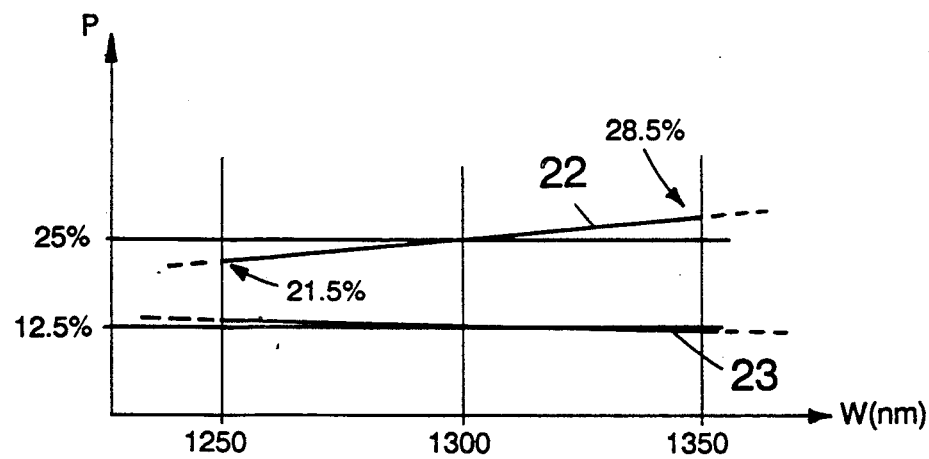
Figure 2C:
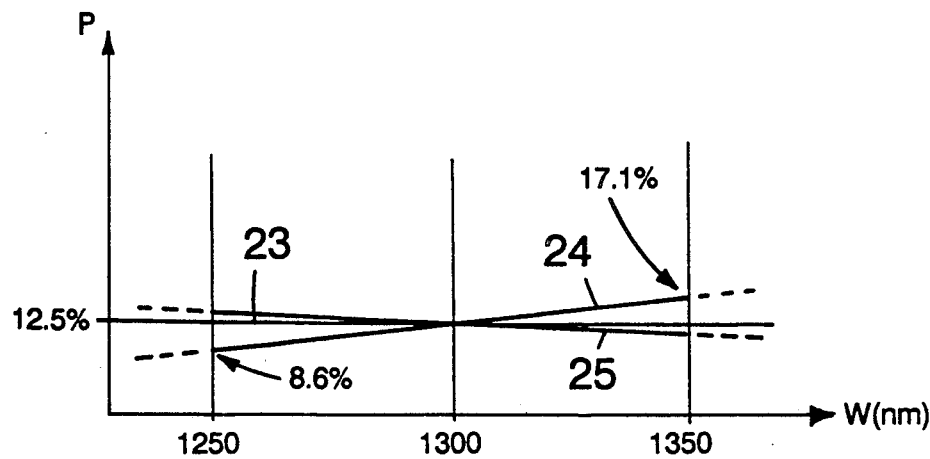

The characteristics of a standard 1×2 coupler, the 1×7 coupler of the invention and the combined 1×7 and 1×2 of FIG. 1 are shown in FIG. 2. The vertical axis of each part of FIG. 2, labeled P, indicates the percentage of total input optical power distributed to the outputs. Excess loss is neglected in these figures. Wavelength, denoted W, in nanometers (nm) is indicated on the horizontal axis of each FIG. 2a, 2b, 2c.

FIG. 2a illustrates the percentage of optical power carried by the through fiber and the coupled fiber in a conventional 1×2 coupler. Over the wavelength range of 1250 to 1350 nm the output power varies 20% in either fiber as shown by the lines labeled 20 and 21.

FIG. 2b illustrates the typical distribution of input power found in a 1×7 coupler of the invention. Line 23 shows the average power carried in any of the six surrounding fibers of the 1×7. Line 22 shows the optical power remaining in the central fiber of the 1×7. Notably, the optical power in the central fiber is much more wavelength dependent than in the surrounding fibers.

According to the invention, the central fiber of the 1×7 is coupled to another fiber as shown in FIG. 1a. This is done by fused tapering fiber 10b to fiber 5. Therefore, the optical represented by line 22 in FIG. 2b becomes the power input optical power to the 1×2 coupler represented in FIG. 2a.

The results of this are shown in FIG. 2c. Line 24 shows the wavelength dependence of the through fiber of the 1×2. Line 25 shows the wavelength dependence of the coupled fiber of the 1×2. The slope of the wavelength dependence in the 1×7 central fiber and the 1×2 coupled fiber tend to offset each other thereby flattening the overall wavelength response of the combined couplers. In FIG. 2c line 23 shows the average optical power carried by any of the surrounding fibers of the 1×7 coupler.

Over the wavelength band of interest, the light distributed to eight fibers in this manner can be seen to vary between about 8.6% and 17% that variation owing entirely to the characteristics of the conventional 1×2 coupler used in this example.

If the conventional 1×2 coupler is replaced by a wideband 1×2 coupler, this variation can be made to range between about 11.0% and 13.5% typically. Therefore, by combining the 1×7 coupler with a following 1×2 coupler the uniformity of optical power among the eight outputs can be made range from about $$10 \log(17/8.6) = 2.9 \text{ dB}$$

to about $$10 \log(13.5/11) = 0.89 \text{ dB}$$

depending on the type of 1×2 coupler used.

Figure 3:
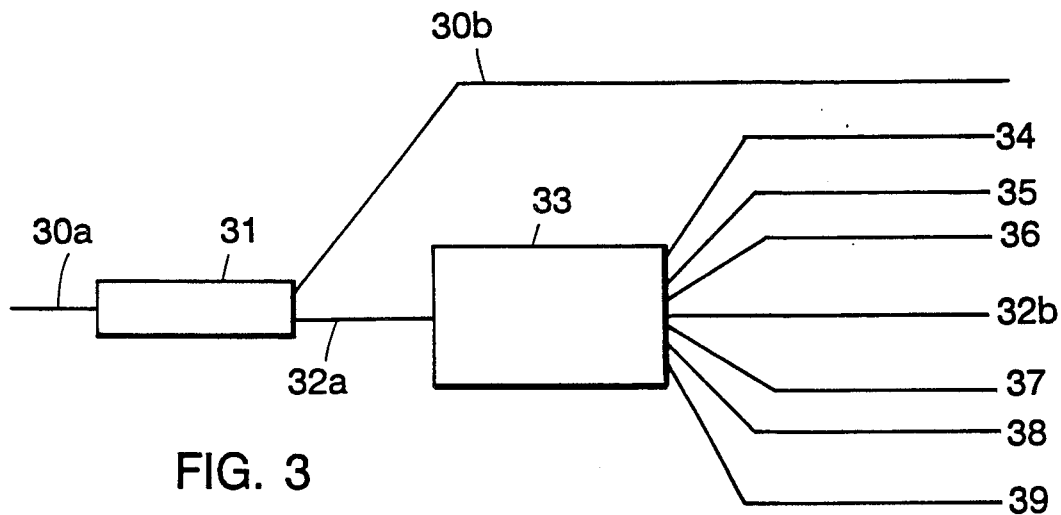
FIG. 3 schematically illustrates a 1×8 coupler embodied with a leading wideband 1×2 preceding a 1×7 coupler.

FIG. 3 schematically illustrates a second embodiment of the invention. A 1×2 coupler 31, which may be either a conventional coupler or preferably a wideband coupler, is followed by a 1×7 coupler 33 of the invention. Optical power is supplied in fiber 10a. In the 1×2 coupler, about 87.5% of the input power is coupled to a fiber 32a which becomes the central fiber in a 1×7 coupler of the invention. The through fiber of the 1×2 30b is made to carry about 12.5% of the input optical power and is used as one of the eight output fibers of the resulting 1×8 combined assembly. The 1×7 coupler is drawn in a manner to provide equal coupling to all seven output fibers. Therefore the 1×7 output fibers 34, 35, 36, 32b, 37, 38, and 39 each carry about 12.5% of the input power at the design wavelength, neglecting excess losses in both couplers.

Figure 4:
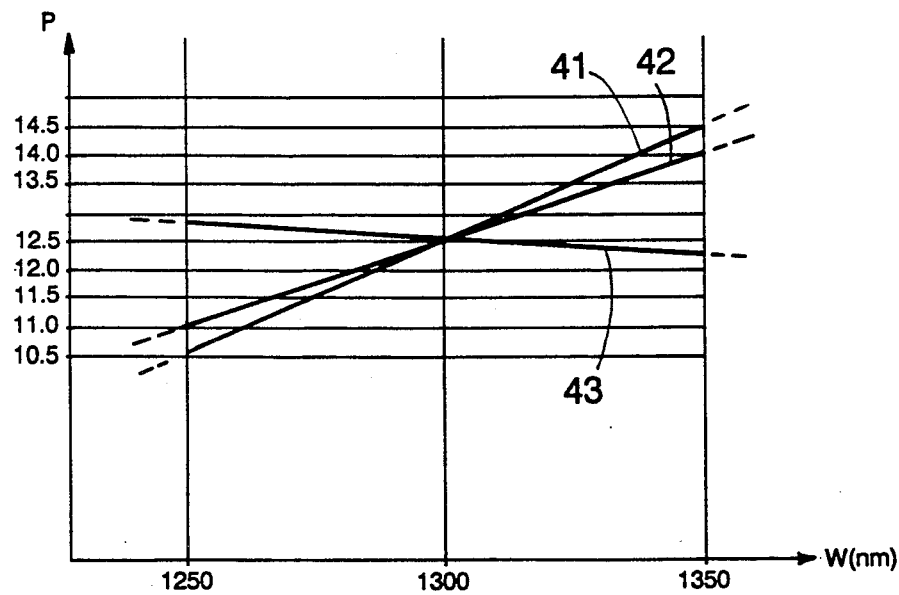
FIG. 4 is a graphical presentation of data showing the coupling versus wavelength characteristics of a 1×8 coupler configured as in FIG. 3.

In a manner similar to that described for the embodiment shown in FIG. 1, the slopes of the coupling curves are chosen to offset wavelength dependent effects. FIG. 4 exemplifies the results of using a leading wideband 1×2 coupler in this embodiment. The vertical axis, labeled P, indicates the percentage of input optical power carried in the output fibers. Wavelength in nanometers is indicated on the horizontal axis. Line 41 shows the dependence of optical power carried in the through fiber 30b of the 1×2 coupler shown in FIG. 3. Line 42 shows the optical power versus wavelength for the central fiber of the 1×7 and line 43 shows the average optical power carried in each of the six surrounding fibers in the 1×7 .

It can be seen that the uniformity at the extremes of the 100 nm bandwidth range is dominated by the uniformity of the wavelength variation of the through fiber of the 1×2. In the worst case, over the given bandwidth, optical power varies in this leg of the coupler between 10.5 and 14.5%. This results in a broadband uniformity for the resulting 1×8 combination of 1.4 dB.

Figure 5:
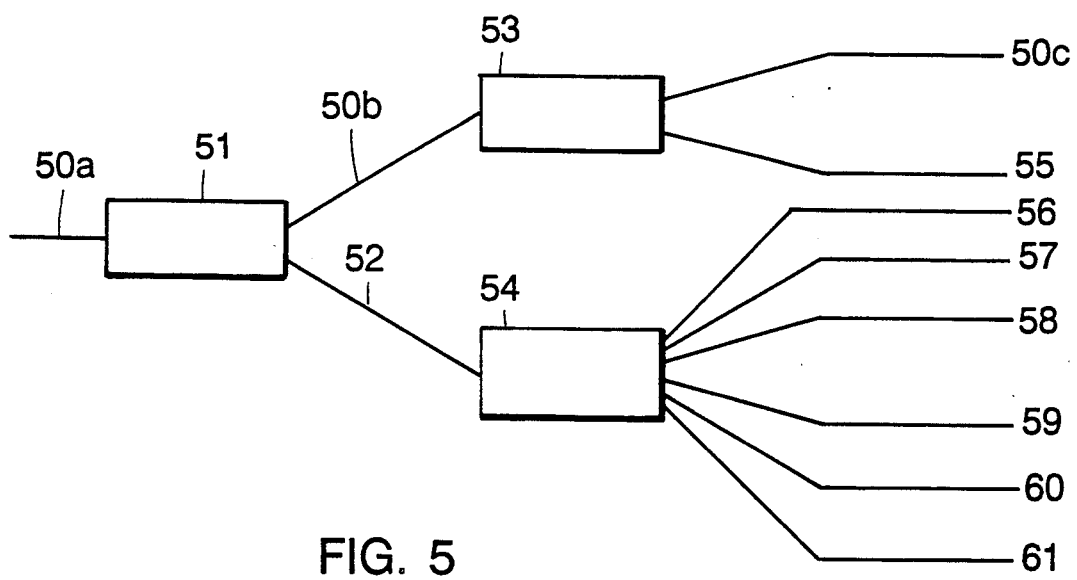
FIG. 5 schematically illustrates a three coupler embodiment resulting in a wide band 1×8 coupler.

A third embodiment of the invention is schematically illustrated in FIG. 5. In this embodiment a first wideband 1×2 coupler 51 splits optical power input in fiber 50a so that output leg 50b carries about 25% of the input power, neglecting excess losses, and leg 52 carries about 75% of the input optical power at two operating wavelengths typically in the vicinity of 1300 and 1550 nm. Leg 50b delivers its 25% of the input power to a second wideband 1×2 coupler 53. Coupler 53 is made to have a 50/50 splitting ratio at wavelengths in the vicinity of 1300 nm and 1550 nm. Output legs 50c and 55 of coupler 53 therefore carry about 12.5% of the power input in fiber 50a. Meanwhile, leg 52 of the first 1×2 coupler 51 delivers about 75% of the input power to a 1×6 coupler of the invention.

The 1×6 coupler is made by drawing the seven fibers shown in FIG. 1b until all of the light carried by the central fiber is coupled into the six surrounding fibers. The 1×6 coupler therefore divides its input so that the outputs of the 1×6, fibers 56, 57, 58, 59, 60, 61, each carry about 12.5% of the power input in fiber 50a.

Figure 6A:
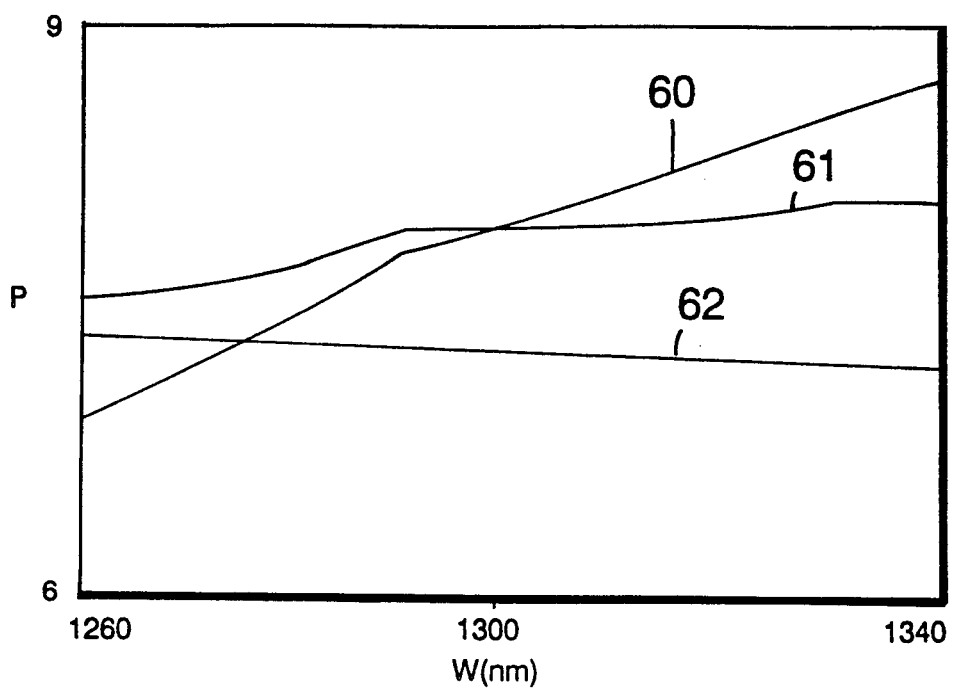
FIG. 6 is a two-part figure showing graphical data representing the coupling versus wavelength characteristics of a a 1×8 coupler configured FIG. 5 wherein the two wavelength ranges around 1300 nm and 1550 nm are shown respectively in FIG. 6a and 6b.
Figure 6B:
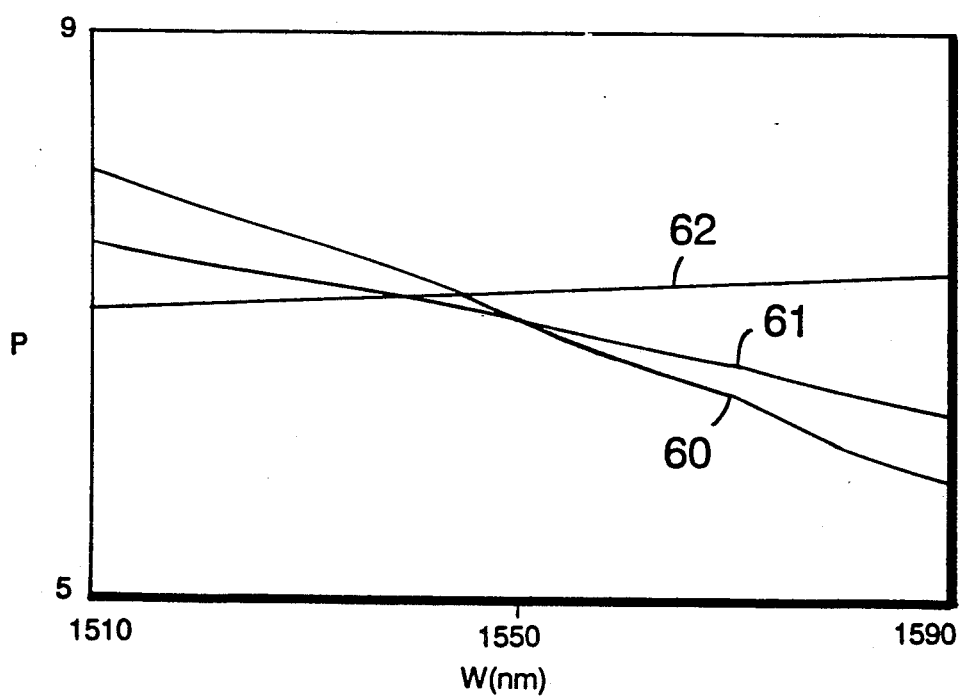

By selection of the wavelength characteristics in each of the couplers, the combination of three couplers yields a flattened wavelength response in two bands of interest around 1300 and 1550 nm. FIG. 6 shows data taken from a three-coupler combination like that illustrated in FIG. 5. FIGS. 6a and 6b show detailed views of the output power P, plotted on the vertical axis, as a function of wavelength W plotted on the horizontal axis in the wavelength bands of interest centered around 1300 nm and 1550 nm. Line 60 is the output of fiber 50c and line 61 is the output of fiber fiber 55 shown in FIG. 5. Line 62 is the average of the six surrounding fibers 56, 57, 58, 59, 60, 61 also shown in FIG. 5.

In the region of 1300 nm, the wideband uniformity encompasses output variation with wavelength between 5.8% and 8.7%. In the 1550 nm region the outputs vary between 8.0% and 5.8%. Respectively the uniformities at 1300 and 1550 are therefore 1.76 dB and 1.4 dB. Some excess loss was present in the devices tested for this data, therefore nominally 7% of the input power is delivered to each of the outputs at the operating wavelengths instead of 12.5%.

In each embodiment exemplified here, a range of coupling ratios is foreseen and the numbers used in these examples are not to be construed to limit the scope of the invention.

Advantageously, the invention discloses a means of fabricating a unitary 1×6 or 1×7 coupler and using that coupler in combination with other couplers to provide a simpler construction for wideband 1×8 couplers.

What is claimed is:

1. A singlemode fiber optic coupler wherein seven fibers are fused and elongated so that six fibers surround a central seventh fiber in a first coupling region, wherein optical power input on said central fiber is distributed among said six surrounding fibers, said distributed light comprising substantially 69% to 81% of said input light proportioned among said surrounding fibers so that any surrounding fiber may carry between 9% and 16% of said input optical power and, after said coupling region, said central fiber carries 19% and 31% of said input optical power, said central fiber extending beyond said first coupling region and being fused to an eighth optical fiber to from a second coupling region further dividing said optical power remaining in said central fiber after said first coupling region substantially equally among said central fiber and said eighth fiber, said surrounding fibers extending in both directions beyond said first coupling region, and said eighth fiber and said central fiber extending in one direction beyond said second coupling region sufficiently to allow access to at least one input fiber and eight output fibers, said first and said second coupling regions and said extending fibers constituting a 1×8 coupler with uniformity of at least 2.9 dB over a wavelength band of at least +/−50 nm.

2. A 1×8 fiber optic coupler as in claim 1 wherein said second coupler region is a wideband coupler.

3. A 1×8 fiber optic coupler comprising a first wideband 1×2 coupling region further comprising an input throughput fiber and a coupled fiber, said 1×2 coupler made to deliver 84% to 91% of the input light in said input fiber to the coupler fiber so that after said 1×2 coupling region, the throughput fiber then carries 9% to 16% of the original input optical power and said coupled fiber then delivers 84% to 91% of the input power to the central fiber of a second fiber optic coupler comprising a 1×7 coupler, said 1×7 coupler is drawn until the seven optical outputs each carry between 9% and 16% of the optical power originally present in the central fiber, said first and said second couplers form, in combination, a 1×8 coupler with uniformity less that 2.0 dB substantially over at least +/−50 nm input wavelength variation.

4. A 1×8 fiber optic coupler as in claim 3 wherein said first coupler is a conventional coupler.

5. A 1×8 fiber optic coupler comprising a first wideband 1×2 coupling region further comprising a coupled fiber and an input throughput fiber, said 1×2 coupler made to deliver 84% to 91% of the input light in said input fiber so that after said 1×2 coupling region, the coupled fiber then carries 9% to 16% of the original input optical power, and said throughput fiber the delivers 84% to 91% of the input power to the central fiber of a second fiber optic coupler comprising a 1×7 coupler, said 1×7 coupler is drawn until the seven optical outputs each carry between 9% and 16% of the optical power originally present in the central fiber, said first and said second couplers form, in combination, a 1×8 coupler with uniformity less than 2.0 dB substantially over at least +/−50 nm input wavelength variation.

6. A 1×8 fiber coupler as in claim 5 wherein said first coupler region is a conventional coupler.

7. A fiber optic coupler as in claim 1, 2, 3, 4, or 5 wherein said first and said second coupling region and said fused fibers form a combined structure within a common package having at least one input optical fiber and eight output optical fibers.

8. A 1×8 fiber optic coupler comprising a combination of three couplers wherein the first coupler is a wideband 1×2 coupler providing substantially a 25% by 75% split of the input optic power into the two outputs so that the 25% leg of said first coupler is routed to a second coupler, said second coupler comprising a wideband 50/50 1×2 coupler so that each output from said second coupler therefore carries about 12.5% of the light input to said first coupler, and, further, the second leg of said first coupler is routed to the central fiber of a third coupler, said third coupler comprising a 1×6 coupler made by drawing a group of seven fibers until substantially all of the power input in said central fiber is distributed uniformly among said six surrounding fibers so that each of the six outputs from this coupler therefore carry substantially 12.5% of the light input to said first coupler.

9. A 1×8 fiber optic coupler as in claim 8 wherein said first coupler is a conventional coupler.

10. A 1×8 fiber optic coupler as in claim 8 wherein said second coupler is a conventional coupler.

11. A 1×8 fiber optic coupler as in claim 8 wherein both said first and said second couplers are conventional couplers.

12. A 1×8 fiber optic coupler as in any one of the claims 1 through 6 and 8 through 11 packaged as two separate units comprising a first coupler package with at least one accessible input fiber and six accessible output fibers, and a second coupler package with at least one accessible input fiber and two accessible output fibers.

13. A 1×8 fiber optic coupler as in any one of the claims 1 through 6 and 8 through 11 packaged as two separate units comprising a first coupler with at least one accessible input fiber and one accessible output fiber, and a second coupler package with as many as six accessible input fibers and seven accessible output fibers.

14. A 1×8 fiber optic coupler as in any one of the claims 1 through 6 and 8 through 11 packaged as a single package having between one and eight input fibers and between one and eight output fibers.

15. A 1×8 fiber optic coupler as in any one of the claims 1 through 6 and 8 through 11 wherein the connection between said first coupling region and said second coupling region is with unbroken optical fiber.

16. A 1×8 fiber optic coupler as in any one of the claims 1 through 6 and 8 through 11 wherein the connection between said first and said second coupling region is made using a fiber optic splice.

17. A method of making a fiber optic coupler as in any one of the claims 1 through 6 and 8 through 11 wherein contact among said seven fibers of said 1×7 coupler is made by wrapping the surrounding fibers helically around the central fiber prior to fusion, the helix angle of said wrapped fibers so disposed being large enough prior to fusion to ensure that each surrounding fiber wraps at least halfway around the central fiber int he length of the region to be fused, said region to be fused being heated and drawn until an appropriate ratio is reached.

18. A method of making a fiber optic coupler as in any one of the claims 1 through 6 and 8 through 11 wherein said seven fibers of said 1×7 coupler are in lateral contact with each other by not wrapping the surrounding fibers helically around the central fiber prior to fusion, the helix angle of said wrapped fibers so disposed being large enough prior to fusion to ensure that each surrounding fiber wraps at least halfway around the central fiber in the length of the region to be fused, said region to be fused being heated and drawn until an appropriate ratio is reached.

* * * * *

UNITED STATES PATENT AND TRADEMARK OFFICE
CERTIFICATE OF CORRECTION

PATENT NO. : 5,166,994

DATED : November 24, 1992

INVENTOR(S) : Stowe et al.

It is certified that error appears in the above-identified patent and that said Letters Patent is hereby corrected as shown below:

Col. 7, line 50: "from" should be --form--.

Signed and Sealed this

Thirtieth Day of November, 1993

Attest:

BRUCE LEHMAN

Attesting Officer

Commissioner of Patents and Trademarks